(12) United States Patent
Schlesinger et al.

(10) Patent No.: US 12,124,863 B2
(45) Date of Patent: Oct. 22, 2024

(54) SYSTEM FOR FILTERING DISPLAYED CONTENT AT THE OS LEVEL

(71) Applicant: Google LLC, Mountain View, CA (US)

(72) Inventors: Benjamin Schlesinger, Ramat Hasharon (IL); Noam Etzion-Rosenberg, Binyamina (IL); Anatoly Efros, Rishon LeZion (IL); Morgan Venable, Seattle, WA (US); Gabriel Taubman, Brooklyn, NY (US); John DiMartile, Seattle, WA (US); Nikita Edward Dubrovsky, Kirkland, WA (US); Sahil Goel, New York, NY (US); Hen Fitoussi, Ramat Hasharon (IL); Sapir Caduri, Tel Aviv (IL)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/909,894

(22) PCT Filed: Mar. 13, 2020

(86) PCT No.: PCT/US2020/022695
§ 371 (c)(1),
(2) Date: Sep. 7, 2022

(87) PCT Pub. No.: WO2021/183140
PCT Pub. Date: Sep. 16, 2021

(65) Prior Publication Data
US 2023/0096274 A1    Mar. 30, 2023

(51) Int. Cl.
*G06F 9/451*    (2018.01)

(52) U.S. Cl.
CPC ...... *G06F 9/451* (2018.02); *G06F 2221/2149* (2013.01)

(58) Field of Classification Search
CPC .................. G06F 9/451; G06F 2221/2149
See application file for complete search history.

(56) References Cited

U.S. PATENT DOCUMENTS

2006/0075507 A1    4/2006 Langer
2013/0117464 A1    5/2013 Brown et al.
(Continued)

OTHER PUBLICATIONS

International Preliminary Report on Patentability in International Appln. No. PCT/US2020/022695, mailed on Sep. 22, 2022, 11 pages.

(Continued)

*Primary Examiner* — Beau D Spratt
(74) *Attorney, Agent, or Firm* — Fish & Richardson P.C.

(57) ABSTRACT

Methods, systems, and apparatus for filtering content at the operating system level. In one aspect, a method includes accessing, at a user device, data that includes content items that are to be presented by an application executing on the user device; prior to the content being presented by the application: for each content item, determining, at the user device and by a filtering model, whether the content item is to be presented by the application or filtered, for each content item that is determined to be presented by the application, allowing the application to present the content item, and for each content item that is determined to be filtered, precluding, by the filtering model by a system level filtering operation performed at an operating system level and separate from an application level at which the application is executing, presentation of the content item by the application.

18 Claims, 3 Drawing Sheets

(56) References Cited

U.S. PATENT DOCUMENTS

| | | | |
|---|---|---|---|
| 2017/0046523 A1* | 2/2017 | Sathish | G06F 21/604 |
| 2017/0289624 A1 | 10/2017 | Avila et al. | |
| 2018/0210960 A1* | 7/2018 | Maycock | G06F 16/248 |
| 2018/0317116 A1* | 11/2018 | Komissarov | H04W 28/0215 |
| 2020/0065864 A1* | 2/2020 | Baumel | G06Q 30/0271 |
| 2020/0099783 A1* | 3/2020 | Liu | G06N 3/08 |
| 2022/0277435 A1* | 9/2022 | Muthusamy | G06V 30/41 |

OTHER PUBLICATIONS

International Search Report and Written Opinion in International Appln. No. PCT/US2020/022695, mailed on Dec. 2, 2020, 17 pages.

Office Action in European Appln. No. 20718445.8, dated Jul. 5, 2023, 5 pages.

* cited by examiner

SYSTEM FOR FILTERING DISPLAYED CONTENT AT THE OS LEVEL

CROSS-REFERENCE TO RELATED APPLICATION

This application is a National Stage Application under 35 U.S.C. § 371 and claims the benefit of International Application No. PCT/US2020/022695, filed Mar. 13, 2020, the disclosure of which is hereby incorporated by reference in its entirety.

BACKGROUND

Content filtering is done for a variety of reasons. For example, content can be filtered to prevent children from being exposed to content that would be inappropriate to view at young ages. Content can also be filtered to prevent "spoilers," i.e., the disclosure of key plot events for television programs or movies. Content can also be filtered out to prevent the harassment of individuals based on gender, ethnicity or religion.

In the context of the Internet, filtering is typically done service side, and is usually application specific. For example, a search engine may have a "safe search" setting enabled that precludes the providing of explicit search results to the user device running the browser. However, the "safe search" setting works only for the search by the search engine, and does not prevent the exposure of content from other websites should a user navigate to the other websites.

By way of another example, an operating system may restrict certain applications from being installed, e.g., applications that are rated "PG-14" in an application store. However, if the application is not rated, the application may still be installed.

Most existing content filtering solutions apply to specific cases but do not solve the problem for filtering content independent of the web site (in the case of a browser) or other environments (in the case of applications other than browsers). Moreover, restricting the installation of specific applications does not achieve many filtering goals, as the many general purpose applications (e.g., instant messaging applications, e-mail applications) can still be installed and expose the user to undesired content.

SUMMARY

This specification relates to a system and method that analyzes and filters undesired content before the digital content is presented to the user on the user device. More particularly, the systems and methods described below analyze, at a user device, content that is to be presented on the user device and filters the content of undesired items before the content is presented to the user of the user device.

In an implementation, a filtering system operates at an operating system (OS) level on a user device, as opposed to operating at an application level for a specific application. As used in this description, an operation at the OS level means either an operation that has access to higher privileges than an operation at an application level, and/or an operation performed by an operating system, where the operation processes content that is to be displayed. For example, data that is to be rendered on the screen display may be processed to identify content to be filtered. The entire content of the screen may be processed, or only certain content may be processed, e.g., only images may be processed.

By way of a further example, an OS level operation may access data being processed by multiple different applications, and may be an operation that affects the presentation of data by the multiple different applications. Conversely, an application level operation is an operation that may only be able to access data being processed by the application to which it belongs, and cannot affect other applications. Thus, by operating at the OS level, the filtering system is agnostic with respect to the applications for which it can filter content.

One example method includes the following operations. The method accesses, at a user device, data that includes a plurality of content items that are to be presented by an application executing on the user device. The content items may be words, phrases, images, video, and audio. Typically, the content items are being processed by the application for presentation by the application, either in a UI for text, images and video, and over an audio output system for audio.

Prior to the content being presented by the application, a filtering model determines whether the content item is to be presented by the application or filtered by the filtering model. The nature of the determination depends on the content type and the filtering model. For example, text can be compared to a list of prohibited words and phrases for a text filter filtering model; conversely, if the filtering model takes into account semantic interpretations of sentences and paragraphs, entire sentences and paragraphs can be filtered, based on the determined semantic interpretation. Any appropriate filtering model can be used, depending on the robustness and sophistication of the filtering desired, and depending on the content type being filtered.

For each content item that is determined to be presented by the application, the filtering model allows the application to present the content item. Conversely, for each content item that is determined to be filtered, the filtering model filters the content item. More particularly, the filtering model precludes, by a system level filtering operation performed at an operating system level and separate from an application level at which the application is executing, presentation of the content item by the application. This can be done, for example, by presenting an opaque mask over filtered text, images and video, or by suppressing or "beeping out" filtered audio.

In some implementations, the filtering element that filters the content item is selectable, and the user may select it to allow the content item to be presented. The filtering model may take this into account and adjust its parameters for future filtering operations. For example, the opaque mask may be selectable, and upon selection, is removed to allow presentation of the filtered content. Likewise, when audio is suppressed, the filtering model may cause the device to state the audio is suppressed, and should the user desire to listen to the audio, what command to use to allow the filtered audio to be presented, e.g., "The song you are about to hear contains explicit lyrics, and I'm going to beep out the explicit words so you can't hear them. However, if you don't find this kind of content objectionable, just say "Let me hear it," and I won't beep out the explicit words."

In general, one innovative aspect of the subject matter described in this specification can be embodied in methods that include the actions of accessing, at a user device, data that includes a plurality of content items that are to be presented by an application executing on the user device; prior to the content being presented by the application: for each content item, determining, at the user device and by a filtering model, whether the content item is to be presented by the application or filtered by the filtering model, for each content item that is determined to be presented by the application, allowing the application to present the content item, and for each content item that is determined to be filtered, precluding, by the filtering model at the user device and by a system level filtering operation performed at an operating system level and separate from an application level at which the application is executing, presentation of the content item by the application. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By filtering at the OS level, the filtering processes described below may filter for specific content across multiple applications and independent of each application. This reduces the likelihood of filtering leaks that may otherwise occur when filtering is done within specification applications. For example, filtering for pornographic content within a search engine may preclude pornographic content from being provided as search results. However, the same pornographic content may be provided if the user navigates to a site hosting the content, or if the user receives the content by e-mail or instant messaging. Conversely, filtering at the operating system level allows for the user device to implement a filtering process for specific content for all applications that provide content for user consumption.

The analyzing and filtering of content is done independent of the application in which the content is to be presented. This solves the problems related to complexity and resources that accompany separate filtering processes for each application. When filtering is done only at the application level, a separate process must be implemented in each application, and thus each application may consume additional processing resources (e.g., image, video, text and audio processing) when determining whether to filter content. Such implementation of separate processes in each application may not be possible; for example, the device may not have control over processes running on the applications, and providing effective filtering presents challenges.

Moreover, the filtering described below may be done exclusively on the user device, and thus a user's preferences need not be processed at the server level. This reduces the amount of network traffic required when a user changes his or her filtering preferences. For example, search results do not need to be resent when a user desires to change his or her filtering preferences for a particular set of search results. Moreover, filtering being done on the user device protects users' information regarding filtering preferences from leaking out to third parties and being used for other purposes besides filtering (e.g., advertising).

Additionally, on-device filtering reduces resources required for content filtering when such filtering is done server side, as content filtering, such as video filtering, is done only on the devices of the users that desire such filtering.

Another advantage is the ability to filter content that has been received at the device in encrypted form. Because the content is decrypted by an application (e.g., by a chat application), the content is "in the clear" prior to presentation. Thus, circumvention of filtering by encryption is defeated at the device. Moreover, the filtering process need not include an encryption/decryption process, thus simplifying content analysis and filtering.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

User devices such as cellular phones, smartphones, PDAs, tablet computers have become very common and an integral part of our daily life. A vast majority of the population now has access to one or more of these devices through which digital content is accessed. These devices are generally capable of performing a variety of tasks such as browsing the Internet, messaging, emailing, downloading content and executing different applications and a variety of other functionalities.

Most of tasks performed by these devices lead to exposure of some sort of digital content to the user. For example, chat applications allow users to send digital content like text messages, images, audio and videos to another user. Browser applications allow access to digital content by means of internet search or digital advertisement. Other examples of such applications may include streaming video applications, online games and cloud based applications.

In all of the above cases where digital content is accessed by applications and presented to the user by the user device, there is always a risk where the user may be exposed to content that is inappropriate for the particular user (e.g., adult content for a child), or that the user may not want to view (e.g., spoilers), or may otherwise be content that is to be filtered from presentation. The systems and methods described below allow a user device to filter such content by filtering at the OS level, across multiple applications simultaneously.

These features and additional features are described in more detail below.

Figure 1:
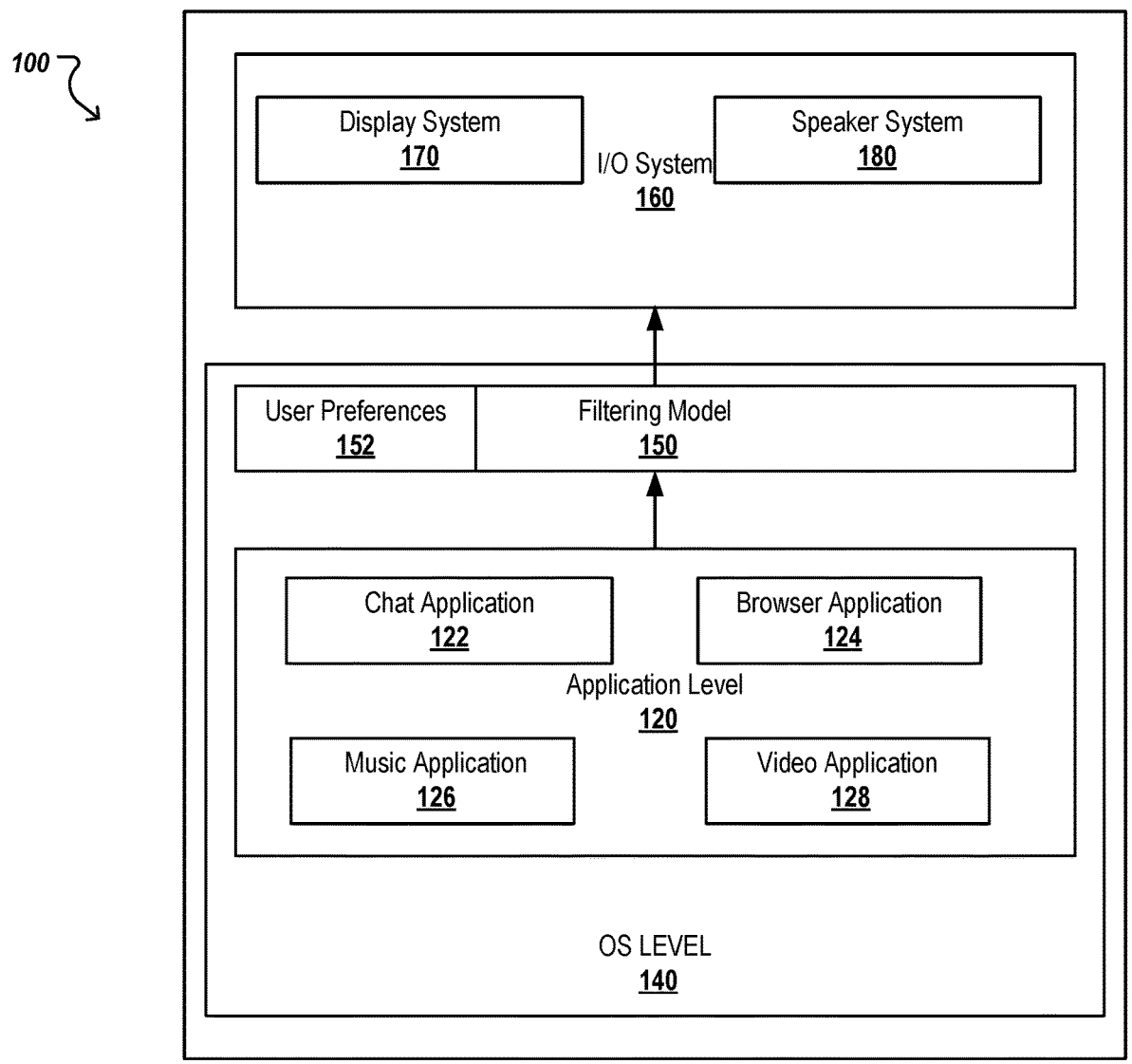
FIG. 1 is a block diagram of an example user device illustrating the abstract level of an operating system.

FIG. 1 is a block diagram of an example user device 100 illustrating the functionality of a user device 100 while presenting digital content to the user. The user device 100 has an application level 120 in which applications execute within the user device 100 operating system. The operating system operates at an OS level 140, e.g., a kernel mode, or a system level operation, such as a text handler, video handler, or audio handler, while the applications operating at an application level 120 other than OS level 140, e.g., a user mode that is less privileged than a root mode, or an operation that occurs within the application environment. Typically, applications operating at the application level 120 will only have access to data specific to the application, while processes operating at the OS level 140 will have access to data for many applications operating at the application level 120.

As illustrated in FIG. 1, a chat application 122, a browser application 124, a music application 126 and a video application 128 are operating at the application level 120. The user device also includes an I/O system 160 that includes a display system 170 that renders application data for the application. The I/O system 160 also includes a speaker system 180 that generates an audio depending on the application that is executing in the application level 120.

The applications executing in the application layer 120 generate digital content items for presentation to the user on the user device 100. A content item may be an image, a set of frames of video, text, and each of sequential portions of audio (e.g., one-second increments of audio, for example). When the user is interacting with a particular application through the user device, the digital content of the particular application is directly presented to the user. For example, if the user is interacting with the browser application 124, the browser application 124 along with the digital contents of the browser application 124 is directly rendered onto the display system 170 within the I/O system 160 of the user device 100. Similarly, when the user is interacting with the music application 126, the music is directly played using the speaker system 180 within the I/O system 160.

A filtering model 150 is implemented at the OS level 140. The filtering model 150 may receive as input the digital content generated by application executing in the application level 120, processes the input, and identify content to be filtered. Upon identifying the content to be filtered, the filtering model 150 precludes the user device 100 from presenting the content to the user. How the filtering model identifies content to be filtered, and how the content is actually filtered, is described in more detail below.

The filtering model 150 operates at the operating system (OS) level (or simply "system level") on the user device 100, as opposed to operating at an application level for a specific application. As used in this description, an operation at the OS level is an operation that has access to higher privileges than an operation at an application level. For example, an OS level operation may access data being processed by multiple different applications, and may be an operation that affects the presentation of data by the multiple different applications.

The filtering model 150 can be implemented as one or more machine-learning model that comprises of multiple parameters wherein the multiple parameters have been trained to identify certain content, such as pornography, expletives, and the like. For example, in some implementations, the filtering model 150 can be a collection of various models that can interpret different types of content, such as skin detection model for videos, various object detection models, and word detection models. The filtering model 150 may process images, video, text and even audio to detect content to be filtered.

In some implementations, the filtering model 150 determines whether content is to be filtered based on user preferences 152. The preferences may specify what type of content, if any, is to be filtered. For example, the filtering model 150 may be able to detect multiple types of content—pornography, expletives, gore, etc. The user preferences 152, after being set up by a user, may specify which, if any, of the types of content are to be filtered. Assuming the user desires that only pornography be filtered, then content that is identified as expletives or gore will not be filtered.

In some implementations and depending on the user preferences 152, upon determining that a particular digital content is to be filtered, the particular digital content will not be presented to the user at all. In other implementations, the particular digital content can processed and a modified, a filtered version of the image is presented to the user. For example, the particular digital content can be blurred, pixelated, mutated or otherwise attenuated before presenting it to the user.

These various operations are implemented filtering operations carried out by the filtering model 150 at the OS level. For example, the filtering model 150 may have access to a library of filtering operations, such as blurring for images and video, muting for audio, and deleting or blurring for text. Images and video that are to be filtered are thus blurred, audio that is to be filtered is muted, and text that is to be filtered is deleted or blurred.

In some implementations, when the filtered content is presented, the user may select the filtered content to reveal the content. For example, in the case of image or text, the user may select the blurred image or text, and the blurred content will be revealed. Alternatively, an administrator role to a specific user may be assigned, and if the user is not the administration, the ability to reveal the filtered content will not be available to the user. In some implementations, the filtering model 150 may update itself based on the user's action to view the digital content that was initially filtered.

Figure 2:
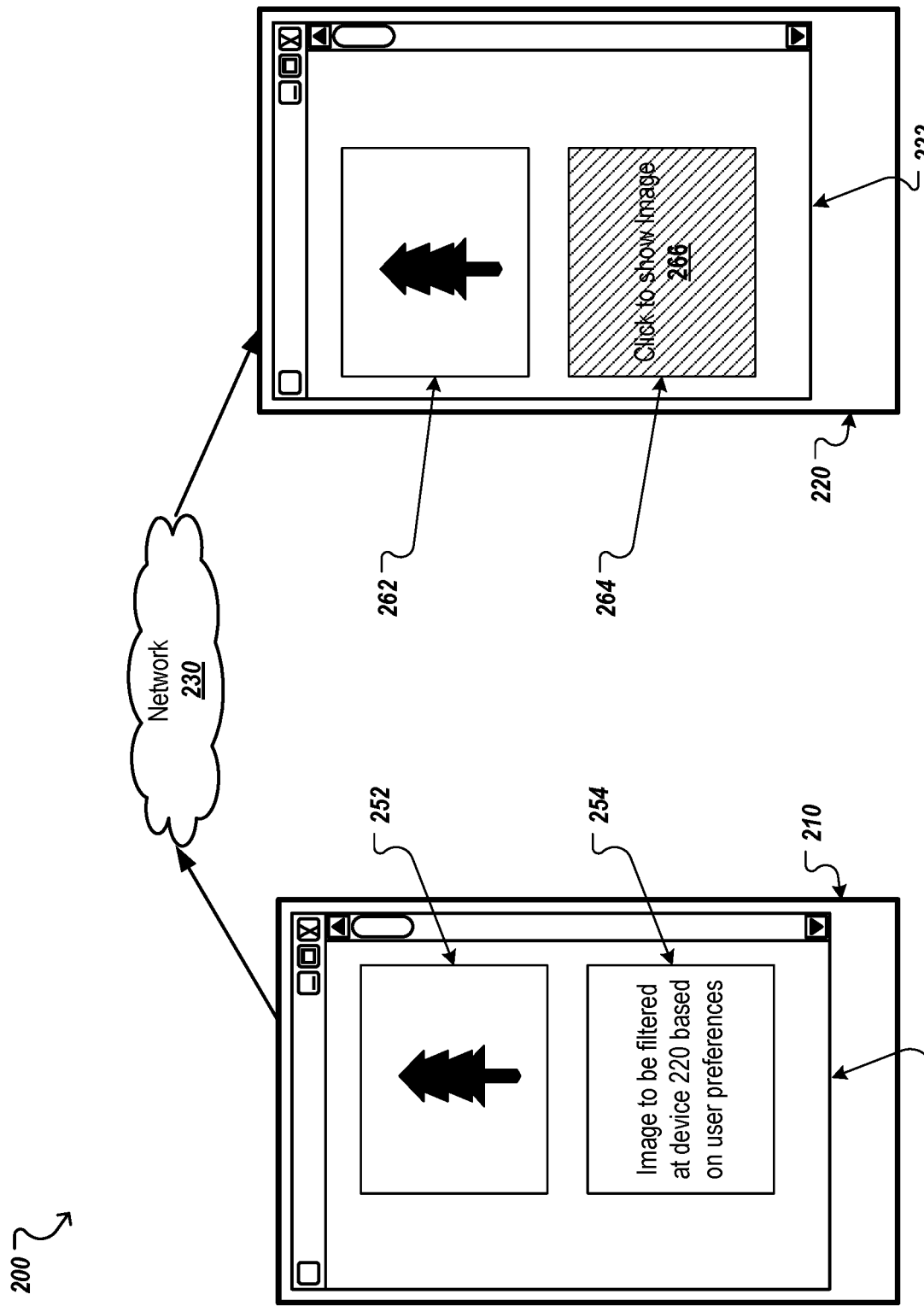
FIG. 2 is a block diagram of an example text application executing in the application level of the operating system.

FIG. 2 is a block diagram illustrating an example chat application where a sender is transmitting digital content from user device 210 to the receiver at the user device 220. The two user devices 210 and 220 are connected by the network 230 enabling transmission of digital content from one device to another. The network 230 comprises a local area network (LAN), a wide area network (WAN), the internet or a combination thereof. In some implementations, the chat application and the network 230 can enable more than two user devices to communicate over the network wherein multiple user devices can send and receive digital content simultaneously.

The sender uses user device 210 to send digital content to the receiver on user device 220. The sender first transmits an image 252 of a tree, which is transmitted over the network 230. In some implementations, the chat application can encrypt the image 252 such that the chat application on the receiver's user device can decrypt it. Upon receiving the encrypted image 252 by the chat application executing on the receiver's user device 220, the chat application decrypts the encrypted image 252 to recover the image 262. The chat application on device 220 provides the image 262 to the filtering model 150. Upon determining by the filtering model 150 that the image 262 is not to be filtered, the image 262 is rendered on the display of the user device 220 for presentation to the receiver. More generally, the above example illustrates that any data that is received in encrypted form and then decrypted by an application can be checked for filtering after decryption and before presentation.

The sender again uses the user device 210 to send an image 254 to the receiver over the network 230. After decryption, the chat application on device 220 provides the image 264 to the filtering model 150. Upon determining by the filtering model 150 that the image 264 is to be filtered (e.g., the image depicts content that the user of the user device 220 has specified in the user preferences 152 to be filtered), the image 264 is rendered on the display along with an opaque layer 266 on top of the image such that the image is occluded from being presented to the receiver. As described above, in some implementations, the filtered content may be revealed. For example, the opaque layer 266, in some implementations, is selectable and the user may select the opaque layer to see the image 264.

With respect to textual data, the filtering model 150 may process text data and detect text in images, such as by optical character recognition. The filtering model 150 may include a semantic interpretation model to identify and extract the meaning textual data. Upon receiving the textual data, the semantic interpretation model will utilize semantic detection algorithms to extract the meaning associated with the text. The filtering model 150 may then determine whether a semantic interpretation of the content item is a prohibited semantic interpretation listed in a list of prohibited semantic interpretations, for example. If so, then the text may be filtered.

In some implementations, the filtering model 150 may further include a sentiment analysis model to determine the sentiment associated with the textual data. In some implementations, these models are based on machine learning algorithms that comprise multiple parameters adjusted to learn rules of natural language by training on a set of examples like a large corpus or a collection of sentences and perform statistical inference. Upon performing textual analysis and after extracting the meaning of the textual data, the filtering system determines whether the textual data is to be filtered, based on user preferences. For example, textual content related to sex or regulated substances may be filtered, based on user preferences.

In some implementations, the model 150 may be trained to identify sections of text to filter. The sections may be identified by content headers or topic identifiers. For example, an article may include a header "Spoiler Alert" that indicate the text following the header includes spoilers for a movie. The model 150 may be trained to filter all text in the article following the "Spoiler Alert" header, for example. Other text filters may include filtering based on word matches to prohibited words.

With respect to audio, the filtering model 150 may process the audio to detect speech and other types of content (e.g., different styles of music, such as classical, country, jazz, metal, and the like). For example, the music application 126 executing within the application level 120 may play audio songs using the speaker system 180. A user may desire the explicit lyrics be filtered. In such implementations, the filtering model 150 will process the audio data to detect for explicit words. Upon determining that particular words in a song are explicit, and based on the user preferences, the filtering system 150 may filter out the words, such as by suppressing the audio or adding a censor beep sound effect in place of the word while playing the music on the user device 100.

In still other implementations, the content may be tagged with descriptors that describe the content, and the model 150 may determine the content based on the tags.

Figure 3:
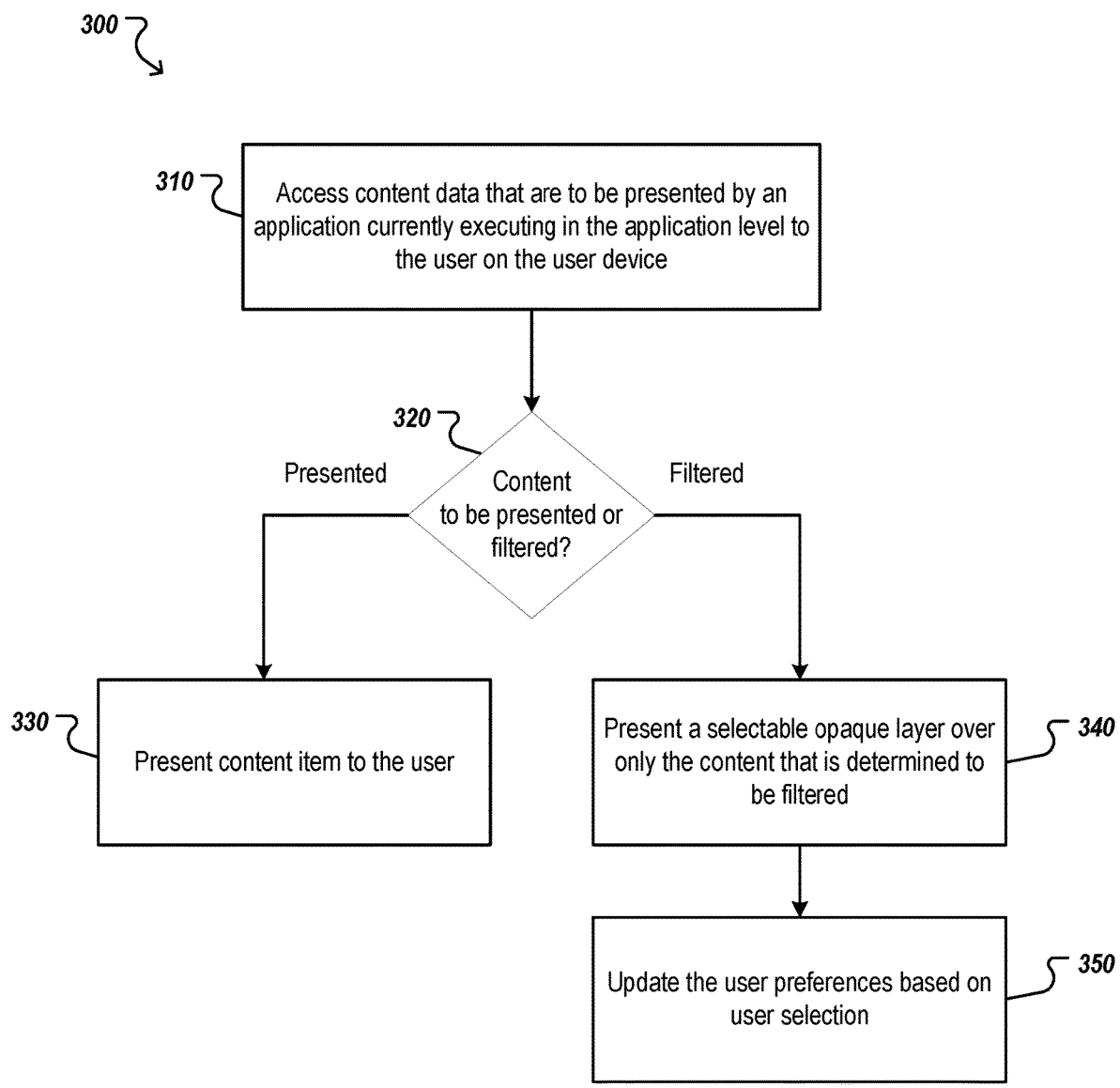
FIG. 3 is a flow diagram of an example process of filtering content generated for presentation to the user.

FIG. 3 is the flow diagram of an example process 300 of filtering digital content generated by an application executing in the application layer. The process 300 is implemented in a computer system, such as a user device 100 that implements the model 150.

The process 300 accesses digital content generated by the applications executing in the application level for presentation to the user (310). The digital content generated by the applications is received as input by the content filtering system 150. For example, the chat application 122 executing in the application level 120 receives a text that has to be presented to the user of the user device. The chat application 122 generates digital content comprising an application specific user interface with the received text for presentation to the user. In some implementations, instead of providing the digital content to the I/O system 160 of the user device 100, the chat application 122 (and other applications at the application level) provide the digital content as input to the filtering model 150. In other implementations, the filtering model 150 may instead receive the digital content from a system level I/O process. For example, when the model 150 is installed on a user device, the OS may provide the digital content to the model in a step prior to video rendering or audio output. In this way, the model 150 captures, from the application, the content that has been processed by the application for presentation by the application. The model 150 may then process the digital content and then, based on user preferences and the type of content detected, cause the user device to perform one or more filtering operations.

After receiving the digital content as input by the filtering model 150, the process 300 determines whether the digital content is to be presented or filtered (320). If the process 300 determines the content is to be presented, then the process presents the digital content to the user (330). For example, upon determining that the digital content to be presented in a user interface in application 120 is no to be filtered, the digital content is provided as input to the I/O system 160. The I/O system 160 then renders the digital content onto the display system 170 for presentation to the user.

If the digital content is determined to be filtered, the process 300 presents a selectable opaque layer over the digital content or a portion of the digital content that was determined to be inappropriate (340). For example, after receiving the image 254 by the user device 210, and upon determining that the image 254 is to be filtered, the filtering system 150 presents a selectable opaque layer 266 over the image for presentation thereby occluding the inappropriate content. Other methods of filtering include not presenting the content at all or blurring, pixelating, mutilating or otherwise attenuate the content before presenting it to the user.

The user, upon being presented with an opaque layer over the filtered content, may wish to see the filtered content. Upon selecting the opaque layer, the user may be provided with an option to view the unaltered digital content. Based on user's actions, the filtering system may update the user preferences (350). In some implementations, user preferences can be independent of user feedback where the user may specify filtering parameters that will not change based on user actions.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   accessing at a user device, data generated by applications executing at an application level on the user device for presentation by an input/output system of the user device, wherein the accessing comprises capturing, from the applications, the data generated by each of the applications and to be provided by the applications to the input/output system, the data including the content items that have been processed by the applications for presentation by the applications;
   prior to the content being presented by the input/output system:
      for each content item, determining, at the user device and by a filtering model of a system level filtering operation performed at the operating system level and separate from the application level at which the applications are executing, the filtering model independent of each of the applications, whether the content item is to be presented by the input/output system or filtered by the filtering model;
   for each content item that is determined to be presented by the input/output system, allowing the input/output system to present the content item; and
   for each content item that is determined to be filtered, precluding, by the filtering model at the user device and by the system level filtering operation performed at the operating system level and separate from an application level at which the applications are executing, presentation of the content item by the input/output system.

2. The computer-implemented method of claim 1, wherein capturing, from the applications, the data generated by each of the applications and to be provided by the applications to the input/output system, comprises capturing content items that the application has been decrypted.

3. The computer-implemented method of claim 1, wherein capturing, the data generated by each of the applications and to be provided by the applications to the input/output system, comprises capturing text data that is to be presented by the applications in a graphical user interface displayed on the input/output system, and each content item is one of a word or phrase.

4. The computer-implemented method of claim 3, wherein determining, at the user device and by the filtering model, whether the content item is to be presented by the input/output system or filtered by the filtering model comprises:
   determining whether the content item is a prohibited content item listed in a list of prohibited content items; and
   determining the content item is to be filtered by the filtering model when the content item is determined to be a prohibited content item listed in the list of prohibited content items.

5. The computer-implemented method of claim 3, wherein determining, at the user device and by the filtering model, whether the content item is to be presented by the input/output system or filtered by the filtering model comprises:
   semantically interpreting content items according to a semantic interpretation model;
   determining whether a semantic interpretation of the content item is a prohibited semantic interpretation listed in a list of prohibited semantic interpretations;
   filtering content items that are determined to be words and phrases having a semantic interpretation that is determined to be a prohibited semantic interpretation listed in the list of prohibited semantic interpretations.

6. The computer-implemented method of claim 3, wherein filtering, by the filtering model at the user device and by the system level filtering operation performed at the operating system level and separate from the application level at which the applications are executing, presentation of the content item by the input/output system comprises:
   presenting an opaque layer over only the words or phrases that are determined to be filtered.

7. The computer-implemented method of claim 6, wherein:
   the opaque layer is selectable; and
   in response to a selection of the opaque layer, the filtering model removes the opaque layer and the words or phrases that are determined to be filtered are presented.

8. The computer-implemented method of claim 1, wherein capturing, from the applications, the content items that have been processed by the applications for presentation by the applications comprises capturing image or video data that is to be presented by the applications in a graphical user interface.

9. The computer-implemented method of claim 8, wherein determining, at the user device and by the filtering model, whether the content item is to be presented by input/output system or filtered by the filtering model comprises:
   determining a content item tag that describes a topic of the content of the image or video;

determining, based on the topic of the content item, whether the content item is a prohibited content item listed in a list of prohibited content items;

determining the content item is to be filtered by the filtering model when the content item is determined to be a prohibited content item listed in the list of prohibited content items.

10. The computer-implemented method of claim 8, wherein determining, at the user device and by the filtering model, whether the content item is to be presented by the application or filtered by the filtering model comprises:

performing image processing on the image or video to determine a topic of the content of the image or video determining, based on the topic of the content item whether the content item is a prohibited content item listed in a list of prohibited content items;

determining the content item is to be filtered by the filtering model when the content item is determined to be a prohibited content item listed in the list of prohibited content items.

11. The computer-implemented method of claim 8, wherein filtering, by the filtering model at the user device and by the system level filtering operation performed at the operating system level and separate from an application level at which the applications are executing, presentation of the content item by input/output system comprises:

presenting an opaque layer over only the image or video that is determined to be filtered.

12. The computer-implemented method of claim 11, wherein:

the opaque layer is selectable; and in response to a selection of the opaque layer, the filtering model removes the opaque layer and the image or video that is determined to be filtered are presented.

13. The computer-implemented method of claim 1, wherein capturing from the applications the data generated by each of the applications and to be provided by the applications to the input/output system, comprises capturing audio data that is to be presented by the applications by an audio output.

14. The method of claim 1, wherein the filtering model is a predefined model, and wherein:

filtering, by the filtering model at the user device and by the system level filtering operation performed at the operating system level and separate from the application level at which the applications are executing, presentation of the content item by the applications comprises:

presenting a selectable opaque layer over only content item that is determined to be filtered;

in response to a selection of the opaque layer:

the filtering model removes the opaque layer and the content that is determined to be filtered is presented; and updating the filtering model based on the selection.

15. The computer-implemented method of claim 1, wherein precluding, by the filtering model at the user device and by the system level filtering operation performed at the operating system level and separate from an application level at which the applications are executing, presentation of the content item by the input/output system comprises precluding presentation of content items from multiple applications simultaneously.

16. A system, comprising:

a user device including a data processing apparatus; and a non-transitory computer readable medium storing instructions executable by the data processing apparatus and that upon such execution cause the data processing apparatus to perform operations comprising:

accessing at a user device, data generated by applications executing at an application level on the user device for presentation by an input/output system of the user device, wherein the accessing comprises capturing, from the applications, the data generated by each of the applications and to be provided by the applications to the input/output system, the data including the content items that have been processed by the applications for presentation by the applications;

prior to the content being presented by the input/output system:

for each content item, determining, at the user device and by a filtering model of a system level filtering operation performed at the operating system level and separate from the application level at which the applications are executing, the filtering model independent of each of the applications, whether the content item is to be presented by the input/output system or filtered by the filtering model;

for each content item that is determined to be presented by the input/output system, allowing the input/output system to present the content item; and for each content item that is determined to be filtered, precluding, by the filtering model at the user device and by the system level filtering operation performed at the operating system level and separate from an application level at which the applications are executing, presentation of the content item by the input/output system.

17. A non-transitory computer readable medium storing instructions executable by a data processing apparatus of a user device and that upon such execution cause the data processing apparatus to perform operations comprising:

accessing at a user device, data generated by applications executing at an application level on the user device for presentation by an input/output system of the user device, wherein the accessing comprises capturing, from the applications, the data generated by each of the applications and to be provided by the applications to the input/output system, the data including the content items that have been processed by the applications for presentation by the applications;

prior to the content being presented by the input/output system:

for each content item, determining, at the user device and by a filtering model of a system level filtering operation performed at the operating system level and separate from the application level at which the applications are executing, the filtering model independent of each of the applications, whether the content item is to be presented by the input/output system or filtered by the filtering model;

for each content item that is determined to be presented by the input/output system, allowing the input/output system to present the content item; and for each content item that is determined to be filtered, precluding, by the filtering model at the user device and by the system level filtering operation performed at the operating system level and separate from an application level at which the applications are executing, presentation of the content item by the input/output system.

18. The non-transitory computer readable medium of claim 17, wherein precluding, by the filtering model at the user device and by the system level filtering operation performed at the operating system level and separate from an application level at which the applications are executing, presentation of the content item by the input/output system comprises precluding presentation of content items from multiple applications simultaneously.

* * * * *